Oct. 23, 1945.   F. M. WEIR   2,387,631
MEANS FOR FORMING LAMINATED SHEET BODIES
Filed Nov. 27, 1943
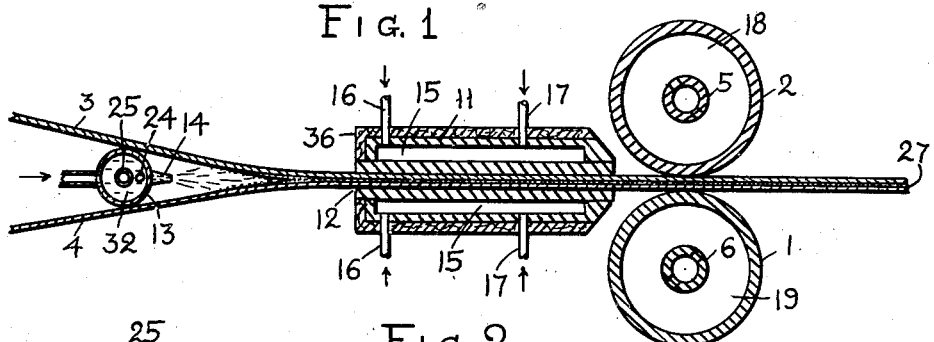
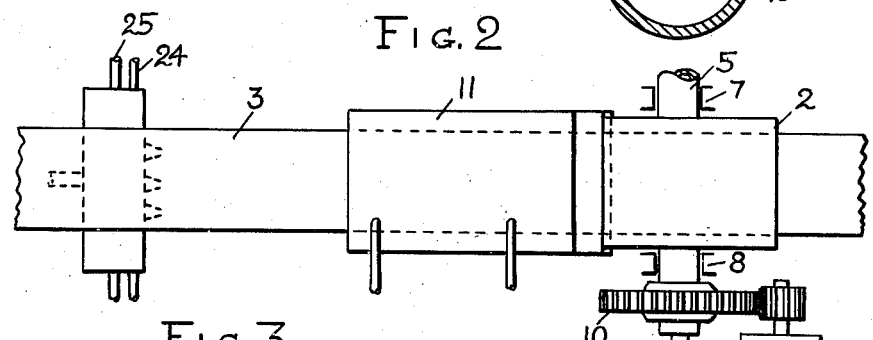
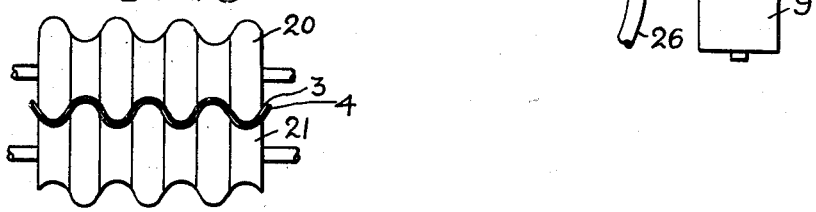
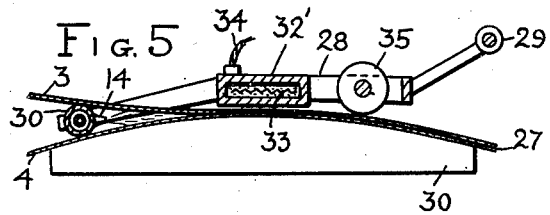
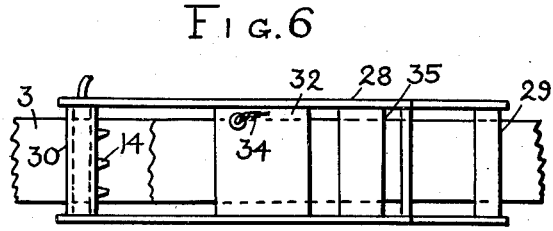
FRANCIS M. WEIR
INVENTOR
BY
John P. Nilonow
ATTORNEY Patented Oct. 23, 1945

2,387,631

UNITED STATES PATENT OFFICE 2,387,631

MEANS FOR FORMING LAMINATED SHEET BODIES

Francis M. Weir, Essex, Conn.

Application November 27, 1943, Serial No. 512,008

2 Claims. (Cl. 144—279)

My invention relates to means for forming laminated sheet bodies and has particular reference to the making of composite sheets and hollow objects by cementing together sheets of a fibrous material, such as wood veneer.

This is a continuation in part of Patent No. 2,335,624, issued November 30, 1943.

It has been found that veneer represents a very good material for forming hollow bodies, such as pontoons, boats, airplane fuselages, etc., by cementing together two or more layers of veneer. In forming curved bodies, especially having a double curvature, it was found necessary to apply heat and pressure to the veneer layers in special moulds by placing the moulds or dies with the veneer in autoclaves. This method is very expensive, however, and besides, it has a disadvantage in that it is difficult to avoid overlapping of the veneer layers, the overlapped joints causing irregularities in the surface of the article and preventing proper adhesion at the sides of the overlapping joint.

I have found that better results can be obtained by using a special device for successively heating and cementing different portions of the product. Veneer sheets are placed for this purpose on a mould and temporarily held in place with a layer or coating of a thermoplastic material between the layers. Heat is then applied locally to one portion of the veneer until the thermoplastic material is softened, the softened portion being then compressed or rolled, being at the same time cooled for hardening the cement.

Long laminated sheets can be also formed by pressing them together between rolls. Separated laminations are coated with the cement composition and are heated prior to being placed between the rolls. The rolls compress the sheets together while cooling them for causing the cement to become set and hardened.

My invention is more fully described in the accompanying specification and drawing, in which:

Fig. 1 is an elevational view of my device in operation;

Fig. 2 is a top plan view of the same;

Fig. 3 is a diagrammatic view of rolls for making continuous sheets.

Fig. 4 is a side view of the rolls for making corrugated sheets.

Fig. 5 is an elevational view of a modified device;

Fig. 6 is a top plan view of the same.

My device for building up laminated sheet bodies is shown in Figs. 1 and 2 in one of its embodiments and consists of a pair of rolls 1, 2 for compressing together two or more sheets 3, 4 of veneer or other sheet material. The rolls are mounted on shafts 5, 6 supported in suitable bearings 7, 8 and driven by a motor 9 through suitable gears 10.

The sheets 3, 4 are guided into the space between the rolls by a box 11 having a central slot 12 of a width sufficient only to let the sheet move freely in close mutual contact. Prior to entering the guiding box, the sheets pass over a pipe 13 with nozzles 14 directed into the space between the sheets. A bonding cementitious fluid 32 is delivered into the pipe 13 through a pipe 24 at a suitable pressure for spraying the fluid on the inner surfaces of the sheets. Any suitable plastic composition may be used for this purpose, the only requirement being that it should be adhesive and mouldable when heated and must be set or solidified when cooled. Ordinary thermosetting substances may be used which become permanently set after cooling, or also thermoplastic substances which can be softened again when subsequently reheated. For convenience, however, all such substances will be hereinafter called "thermoplastic," since it is immaterial for the operation of my device whether the plastic cement will soften again when the product is reheated. The plastic composition is maintained in a fluid state by a pipe 25 through which circulates hot water or steam.

The guiding box 11 also serves as a means for heating and softening the plastic cement between the sheets. The length of the box is such that the cement is fully softened during the time of passage of the sheets through the slot in the box.

The box 11 is hollow, having inner chambers 15, through which a hot liquid is circulated by pipes 16, 17. Any other suitable heating medium may be employed, however, such as electric or steam heating. A layer 36 of a heat insulating material is placed over the box.

The heated and softened sheets are drawn by the rolls 1, 2 being at the same time compressed together and cooled off. The rolls are made hollow for this purpose, the inner chambers 18, 19 being in communication with a source of cooling liquid through hollow shafts 5, 6, and pipes 26. The two sheets become firmly welded together with a layer 27 of plastic bond between them.

Corrugated rolls 20, 21 can be used for making corrugated veneer sheets as shown in Fig. 3.

Built up veneer angles and similar shapes can be manufactured by rolling strips of sheet material between specially shaped rolls 22, 23, Fig. 4.

A modified device is shown in Figs. 5 and 6. It consists of a frame 28 with a handle 29 for moving the device over the surface of the sheets 3, 4 placed over a mould 30. A pipe or hollow box 31 is supported between the sides of the frame at the rear end for spraying the plastic bond between the sheets through nozzles 14. A heating box 32' is also supported between the sides of the frame and may be provided with an electric heater 33 with electric conductors 34. The heated sheets are compressed together by a roll 35 which may be hollow and filled with a cooling liquid, "dry ice," or similar coolant. The device is moved manually over the sheets on the mould, causing the sheets to take the shape of the mould.

The spraying pipe 13 in Fig. 1 or 31 in Fig. 5 may be omitted if the sheets are provided with thin layers of a thermoplastic material which is softened by the application of heat.

It is understood that my device for forming laminated sheet bodies may be further modified without departing from the spirit of the invention, as set forth in the appended claims.

I claim as my invention:

1. A device for forming a laminated body from sheets of a pliable material, comprising a heating member having a slot for the sheets, the slot being of a width to bring the sheets together; a tubular container supported at the rear of the heating member and spaced therefrom, the sheets being adapted to be moved above and below the tubular container prior to their entering the slot, nozzles on the tubular member, the tubular container being arranged to contain a cementitious substance for spraying into the converging space between the sheets; and rotary rolls in front of the heating member frictionally engaging the sheets from the opposite side for drawing the sheets through the slot in the heating member and means to cool the rolls thereby cooling the sheets.

2. A device for forming a laminated body from sheets of a pliable material, comprising a heating member having a slot for the sheets, the slot being of a width to bring the sheets together; a tubular container supported at the rear of the heating member and spaced therefrom, the sheets being adapted to be moved above and below the tubular container prior to their entering the slot, nozzles on the tubular member, the tubular container being arranged to contain a cementitious substance for spraying into the converging space between the sheets; hollow rolls in front of the heating member above and below the sheets frictionally engaging the sheets; means to rotate the rolls for moving and compressing the sheets by the rolls; and means to supply a cooling medium into the rolls for cooling the sheets.

FRANCIS M. WEIR.